June 2, 1931. T. P. CHASE 1,808,206
BRAKE CENTRALIZER
Filed July 17, 1929

Inventor
Theron P. Chase
By Blackmore, Spencer & Flint
Attorneys

Patented June 2, 1931

1,808,206

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

BRAKE CENTRALIZER

Application filed July 17, 1929. Serial No. 378,958.

This invention relates to brakes, and particularly to a novel centralizing mechanism for the shoes of an internal brake.

An object of the invention is to provide a simple structural arrangement to centralize the brake operating mechanism. Other objects and advantages will be understood from the following description.

Figure 1:
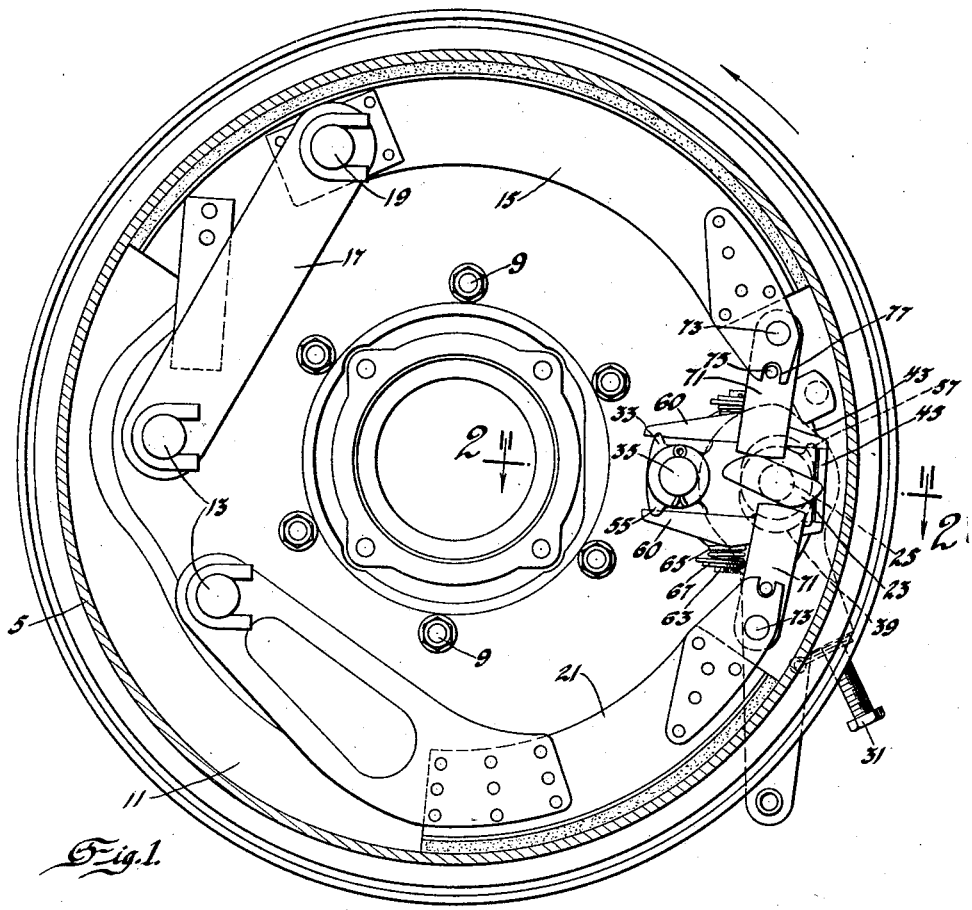
Figures 2, 3:
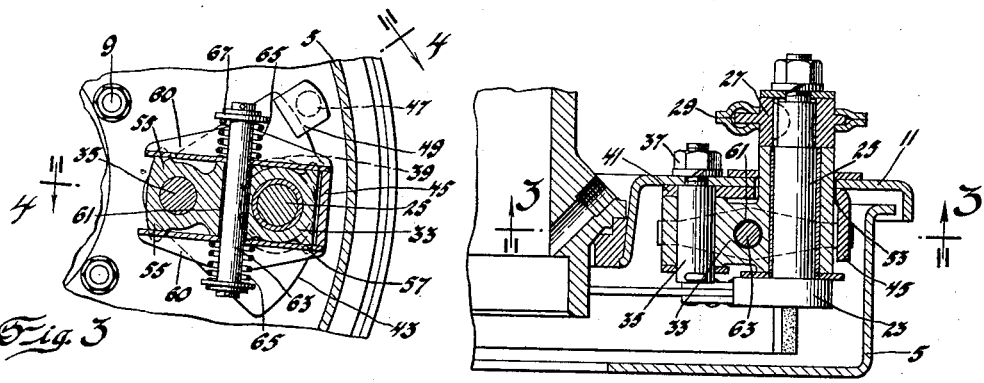
Figure 4:
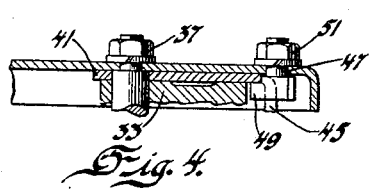

In the drawings, Figure 1 is a view in elevation of the brake shoes and of the operating mechanism therefor, having my new centralizer associated therewith. Figure 2 is a section on line 2—2 of Figure 1. Figure 3 is a section on line 3—3 of Figure 2. Figure 4 is a section on line 4—4 of Figure 3.

Referring by reference characters to the drawings, numeral 5 represents the flange of a brake drum, the drum being of the type usually carried by vehicle wheels. Fastening means 9 secure a backing plate 11 to a vehicle axle. Pivoted to the backing plate by the anchor pins, 13, are the brake shoes to engage the drum. Shoe 15 is not directly pivoted to the backing plate, but there is interposed an articulating link, 17, pivoted on pin 13, and also pivotally connected with the shoe at 19. Shoe 15 is the self-actuating shoe for forward driving. It is shown as longer than the other shoe and the articulated connection, 17, is to insure that it may conform to the drum when the brake is applied.

Shoe 21 is the shoe positioned to be self-actuating for checking rotation of the drum in case of driving in reverse. This shoe is directly pivoted on anchor pin 13. The shoes are spread apart in the action of applying the brake by a cam, 23, on a shaft, 25. On shaft 25, outside the drum, there is keyed a flange hub, 27, and surrounding the flanged hub is a stamped operating arm, 29, which may be provided with suitable means for adjustment relative to the hub. The adjustment employed is not a part of this invention and is not fully illustrated. It includes a screw, 31, as shown in Figure 1. The cam shaft is rotatably journalled in a swinging journal member, 33, this journal member being rotatably mounted on a pivot pin, 35, secured by nut, 37, to the backing plate, 11. The purpose of providing this mounting for the cam shaft is to permit the cam to move slightly in a circumferential direction to accommodate self-actuation and by thus dividing equally between the shoes the applied pressure to render the pedal action comparatively light. To accommodate such swinging of the journal member on its pivot, 35, the backing plate is provided with an elongated aperture, 39. Also mounted to be at times rotated on pin 35 and positioned between the backing plate, 11, and the journal member, 33, is a plate, 41, lying flat against the backing plate and having at one part of its arc-shaped edge, 43, a flange, 45. This plate, 41, is adjustable about its pivot, 35, but is normally held from movement about said pivot by a stud, 47, having a flange, 49, over-lying the edge, 43. The stud passes through the backing plate and is held by a nut, 51. The plate, 41, is provided with an elongated aperture, 53, to accommodate the movements of the journal portion of member 33. The journal member, is provided with projections 55, adjacent the pivot pin, 35, and with plane surfaces 57, the projections, 55, lying in the planes of surfaces, 57. The transverse dimension of journal, 33, in the region of the surfaces, 57, is the same as the linear extent of flange 45, as will be seen from an inspection of Figure 3. Resting against the projections, 55, the surfaces, 57, and the edges of flange 45, are channel members, 60. Journal member 33 is apertured as at 61 to receive freely a rod, 63, which rod also extends through the webs of channel members, 60. In the case of each channel member there is a spring 65 surrounding the rod and seated against the channel member and against a suitable abutment, 67, carried by the rod adjacent the end.

There is no novelty herein alleged for the operating means between the cam, 23, and the adjacent ends of the shoes. I have shown thrust links, 71, pivoted to the shoes as at 73 at the points removed from the extreme end of the shoes. Each link carries a pin 75 movable in a slot 77 at the extreme end of the shoe to give a limited swinging movement about pin 73. The ends of the links are provided with curved surfaces to engage the cam. By this means a limited rolling movement between the cam and the thrust link is provided during the act of applying the brake.

When the brake is in its position of release, the parts are in a position shown by the drawings. When the brake is applied by swinging lever 29, there being any suitable linkage associated with the said lever, the cam rotates and through the thrust links, forces the shoes against the drum. If the drum is rotated in the direction of the arrow on Figure 1, as for checking forward movement of the vehicle, the shoe, 15, is self-actuating, its motion, due to engagement with the drum, being the same as the movement imparted to it by the cam. Shoe 21 tends to be moved by drum rotation in a direction opposite to that imparted to it by the cam. The drum rotation therefore opposes the rotation of the cam and owing to this opposed force the pedal pressure required to sufficiently rotate the cam to press shoe 15 against the drum would be unduly high unless some provision were made to correct this difficulty. The difficulty is avoided in the well known way of floating the cam by mounting it to swing about a pivot, this pivot being 35. As a result of this construction, the cam shaft with the cam has a bodily movement whereby the rotary movement manually given the cam is equally divided between the two shoes. It is important that after the cam has floated from its position of rest by rotation of the journal member 33 it should be returned to the position shown in Figure 1 after the brake has been released. Unless some provision is made to so restore the cam, a tendency on the part of one shoe to drag may hold the floating cam in the position which it has assumed when automatically moved to equalize the forces applied to the brake shoes. The construction shown to accomplish this purpose involves the channel members 60 and the springs, 65. When the cam is rotated to check forward motion, the journal member, 33, rotates counter-clockwise. The upper channel member, 60, is lifted off the end of flange 45 by engagement of the surfaces, 57, with the channel member, 60. The position of the upper channel member is determined by the position of the upper projection 55 and the upper plane surface, 57. In the meantime, the lower channel member is held by the lower edge of flange, 45, and by the lower projection, 55, which has swung slightly about its pivot center, 35. Since the rod, 63, carrying the outer abutments for the two springs is freely slidable in member 33, the tension of the two springs is equalized and both are active to resist the departure of the cam shaft from its normal position of rest. This is equally true which ever way the cam shaft may have been moved about its pivot center, 35, whether counter-clockwise for restraining forward vehicle movement or clockwise for checking reverse travel. The energy stored up in these springs, 65, by the movement of the cam shaft is always latent to restore the cam shaft to its initial position and to overcome any tendency on the part of either of the shoes to drag due to the influence of drum rotation.

It will be seen that by the construction shown and described, the neutral position of rest may be predetermined by the adjustment of bolt, 47, and plate, 41, the latter in its adjustment changing the position of flange, 45. If one of the shoes becomes excessively worn, the centralized position requires a change to secure equal clearance for the two shoes. This is easily done by loosening the nut, 51, on the bolt, 47 and then applying the brake with the vehicle at rest. In so applying the brake, the plate member, 41, moves together with journal member, 33, as the latter swings to accommodate the unequal clearance between the shoes and the drum. With the brake so applied, the nut, 51, is tightened to hold the plate 41 in its new position of adjustment. By this means the shoe clearance is equalized and the normal action of the centralizer is restored.

I claim:

1. In a centralizer for brakes, a brake actuating shaft, a swinging journal carrying said shaft, said journal having opposite faces, said shaft being rotatably supported in said journal, a fixed plate having oppositely disposed edges normally in alinement with said faces, oppositely located spring seats, resilient means holding said spring seats against said edges and faces and said faces and edges in alinement.

2. In a brake, a drum, shoes to engage said drum, means to expand said shoes into engagement with the drum, said expanding means including a shaft mounted to move circumferentially to accommodate self actuation, a swinging journal for said shaft to provide said circumferential movement, stop means, plates engaging said stop means and opposite faces of said journal, yielding means operable to normally hold both said plates on said stop.

3. The invention defined by claim 2 together with opposite projections on said journal said projections also engaging said plates.

4. In a brake, actuating means, means to float said actuating means for movement in opposite directions from the neutral position, centralizing means comprising a plurality of oppositely positioned yielding means, means connecting said yielding means with said floating means, whereby both yielding means are tensioned upon a floating movement of said actuating means in either direction of movement.

5. In a brake, a drum, shoes having adjacent ends, means to spread said ends and expand said shoes into drum engagement, movable means carrying said shoe expanding means, a stop, a plurality of oppositely positioned means engaging said stop and said movable means, a rod passing through said movable means and through said oppositely positioned means, a plurality of springs, one seated against each oppositely positioned means and engaging an abutment on said rod.

6. In a brake, a drum, shoes having adjacent ends, means to spread said ends and expand said shoes into drum engagement, swinging means carrying said expanding means, a stop, oppositely positioned plates normally engaging said stop, and a plurality of points on said swinging means, a rod freely extended through said swinging means and said plates, coil springs surrounding the ends of said rod and seated against said plates, and abutments for the outer ends of said springs carried by said rod.

7. The invention defined by claim 6, together with a backing plate and plate rigid with said stop, said last named plate having means associated therewith to adjust its position relative to the backing plate.

8. A centralizer for brakes, including a drum, shoes to engage the drum, means to expand said shoes into drum engagement, said centralizer comprising a swinging journal for rotatably supporting said expanding means and to move it bodily, a stop, a plurality of plates engageable with opposite faces of said swinging journal and with opposite parts of said stop, a plurality of resilient means, one associated with each plate to hold said plates in contact with both the swinging journal and with said stop.

9. In combination, a drum, a backing plate, shoes pivoted to the backing plate to engage said drum, means to expand said shoes into drum engagement, a swinging member having opposed faces, said expanding means being carried rotatably and for bodily movement by the swinging movements of said swinging member, said member having oppositely disposed plane surfaces, a stop having opposed surfaces in the planes of said plane surfaces in one position of swinging adjustment of the swinging member, oppositely disposed elements engageable with said surfaces of the stop and the swinging member when in said position of swinging adjustment, and yielding means holding said elements in engagement with said surface.

10. The invention set forth in claim 9, said yielding means comprising a plurality of springs one for each element and a rod extending through said swinging member and said elements and terminal abutments for said springs on said rod.

In testimony whereof I affix my signature.

T. P. CHASE.